US011334758B2

(12) United States Patent
Tang et al.

(10) Patent No.: US 11,334,758 B2
(45) Date of Patent: May 17, 2022

(54) METHOD AND APPARATUS OF DATA PROCESSING USING MULTIPLE TYPES OF NON-LINEAR COMBINATION PROCESSING

(71) Applicant: HUAWEI TECHNOLOGIES CO., LTD., Guangdong (CN)

(72) Inventors: Ruiming Tang, Shenzhen (CN); Huifeng Guo, Shenzhen (CN); Zhenguo Li, Hong Kong (CN); Xiuqiang He, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 159 days.

(21) Appl. No.: 16/729,043

(22) Filed: Dec. 27, 2019

(65) Prior Publication Data
US 2020/0134361 A1 Apr. 30, 2020

Related U.S. Application Data

(63) Continuation of application No. PCT/CN2018/093093, filed on Jun. 27, 2018.

(30) Foreign Application Priority Data

Jun. 30, 2017 (CN) .......................... 201710524501.3

(51) Int. Cl.
G06K 9/62 (2022.01)
(52) U.S. Cl.
CPC ......... *G06K 9/6221* (2013.01); *G06K 9/6239* (2013.01); *G06K 9/6286* (2013.01); *G06K 9/6287* (2013.01)
(58) Field of Classification Search
None
See application file for complete search history.

(56) References Cited

U.S. PATENT DOCUMENTS

2001/0002202 A1* 5/2001 Feher ...................... H04L 27/38
375/130
2012/0096020 A1* 4/2012 Friedlander ...... G06Q 10/06311
707/769
(Continued)

FOREIGN PATENT DOCUMENTS

CN 102867516 A 1/2013
CN 103222243 A 7/2013
(Continued)

OTHER PUBLICATIONS

Weinan Zhang et al. Deep Learning over multi-field categorical data, ECIR 2016, LNCS 9626, pp. 45-57, 2016.
(Continued)

*Primary Examiner* — Tahmina N Ansari
(74) *Attorney, Agent, or Firm* — Womble Bond Dickinson (US) LLP

(57) ABSTRACT

The method includes: obtaining a plurality of pieces of feature data; automatically performing two different types of nonlinear combination processing operations on the plurality of pieces of feature data to obtain two groups of processed data, where the two groups of processed data include a group of higher-order data and a group of lower-order data, the higher-order data is related to a nonlinear combination of m pieces of feature data in the plurality of pieces of feature data, and the lower-order data is related to a nonlinear combination of n pieces of feature data in the plurality of pieces of feature data, where m≥3, and m>n≥2; and determining prediction data based on a plurality of pieces of target data, where the plurality of pieces of target data include the two groups of processed data.

19 Claims, 4 Drawing Sheets

(56) References Cited

U.S. PATENT DOCUMENTS

| | | | |
|---|---|---|---|
| 2014/0173143 A1 | 6/2014 | Li et al. | |
| 2014/0310301 A1 | 10/2014 | Li | |
| 2020/0134361 A1* | 4/2020 | Tang | G06K 9/6221 |
| 2020/0249543 A1* | 8/2020 | Bienstman | G02F 3/028 |
| 2020/0272913 A1* | 8/2020 | Yu | G06F 16/00 |

FOREIGN PATENT DOCUMENTS

| | | |
|---|---|---|
| CN | 105844330 A | 8/2016 |
| CN | 106096877 A | 11/2016 |

OTHER PUBLICATIONS

Yanru Qu et al. Product-based neural networks for user response prediction, 2016 IEEE 16th International Conference on Data Mining, pp. 1149-1154.

Heng-Tze Cheng et al. Wide and Deep learning for recommendation systems, DLRS '16 Sep. 15-15, 2016, total 4 pages.

\* cited by examiner

METHOD AND APPARATUS OF DATA PROCESSING USING MULTIPLE TYPES OF NON-LINEAR COMBINATION PROCESSING

CROSS-REFERENCE TO RELATED APPLICATIONS

This application is a continuation of International Application No. PCT/CN2018/093093, filed on Jun. 27, 2018, which claims priority to Chinese Patent Application No. 201710524501.3, filed on Jun. 30, 2017. The disclosures of the aforementioned applications are hereby incorporated by reference in their entireties.

TECHNICAL FIELD

This application relates to the field of computer technologies, and in particular, to a data processing method and apparatus.

BACKGROUND

With development of computer technologies, when people analyze an object that can dynamically change (for example, a quantity of access times for a specific website, a quantity of download times for a specific file, a click-through rate of an icon of a specific application in an application store, or a click-through rate of a specific video on a video website), usually, a plurality of pieces of feature data of the object (the feature data is used to indicate an attribute of the object) may be obtained, and the plurality of pieces of feature data are processed, to obtain prediction data used to indicate a development trend of the object.

In the related art, people may enter the plurality of pieces of feature data of the object into a data processing apparatus. The data processing apparatus can perform higher-order nonlinear combination processing on the plurality of pieces of feature data of the object to obtain a plurality of pieces of higher-order data, and determine the prediction data based on the plurality of pieces of higher-order data. The higher-order data is a nonlinear combination of at least three pieces of feature data in the plurality of pieces of feature data. For example, the data processing apparatus may perform higher-order nonlinear combination processing on a plurality of pieces of feature data of the specific application in the application store to obtain prediction data used to indicate the click-through rate of the icon of the application, and a recommendation priority of the application can be determined based on the prediction data.

Because the prediction data in the related art is obtained by the data processing apparatus based on the plurality of pieces of higher-order data, and accurate prediction needs to be implemented based on a large amount of data. A data volume of the plurality of pieces of higher-order data still cannot meet an accurate prediction requirement. Consequently, accuracy of the prediction data determined in the related art is relatively low.

SUMMARY

To resolve a problem that accuracy of prediction data determined in the related art is relatively low, this application provides a data processing method and apparatus. The technical solutions are as follows:

According to a first aspect, a data processing method is provided, where the method includes: obtaining a plurality of pieces of feature data; automatically performing two different types of nonlinear combination processing on the plurality of pieces of feature data to obtain two groups of processed data, where the two groups of processed data include a group of higher-order data and a group of lower-order data, the higher-order data is related to a nonlinear combination of m pieces of feature data in the plurality of pieces of feature data, and the lower-order data is related to a nonlinear combination of n pieces of feature data in the plurality of pieces of feature data, where $m \geq 3$, and $m > n \geq 2$; and determining prediction data based on a plurality of pieces of target data, where the plurality of pieces of target data include the two groups of processed data.

In the related art, one group of processed data (including at least one piece of higher-order data) can be obtained by performing one type of nonlinear combination processing (higher-order nonlinear combination processing) on the plurality of pieces of feature data. However, in this application, two groups of processed data can be obtained by automatically performing two different types of nonlinear combination processing (higher-order nonlinear combination processing and lower-order nonlinear combination processing) on the plurality of pieces of feature data. In other words, a data volume of the two groups of processed data obtained in this application is greater than a data volume of one group of processed data obtained in the related art, and a large amount of data is needed to implement accurate prediction. Therefore, prediction data obtained based on two groups of processed data in this application is more accurate than prediction data obtained based on one group of processed data in the related art.

In one embodiment, the automatically performing two different types of nonlinear combination processing on the plurality of pieces of feature data to obtain two groups of processed data includes: automatically performing higher-order nonlinear combination processing on the plurality of pieces of feature data to obtain the group of higher-order data; and automatically performing lower-order nonlinear combination processing on the plurality of pieces of feature data to obtain the group of lower-order data.

It should be noted that, after the plurality of pieces of feature data are obtained, if an amount of higher-order data obtained by performing higher-order nonlinear combination processing on some feature data in the plurality of pieces of feature data is a first amount, and an amount of lower-order data obtained by performing lower-order nonlinear combination processing on some other feature data in the plurality of pieces of feature data is a second amount, an amount of target data based on which the prediction data is finally determined is equal to a sum of the first amount and the second amount. If higher-order nonlinear combination processing is performed on the plurality of pieces of data, an amount of obtained higher-order data is greater than the first amount, and lower-order nonlinear combination processing is also performed on the plurality of pieces of data, an amount of obtained lower-order data is greater than the second amount, and therefore, an amount of target data based on which the prediction data is finally determined is greater than the sum of the first amount and the second amount. In other words, when the higher-order nonlinear combination processing and the lower-order nonlinear combination processing are separately performed on the plurality of pieces of feature data, there is a relatively great amount of target data based on which the prediction data is finally determined, and the prediction data is more accurate.

In one embodiment, after the obtaining a plurality of pieces of feature data, the method further includes: automatically performing linear combination processing on the plurality of pieces of feature data to obtain a group of first auxiliary data, where the first auxiliary data is related to a linear combination of at least two pieces of feature data in the plurality of pieces of feature data, and the plurality of pieces of target data further include at least one piece of the first auxiliary data.

In other words, in this application, not only the higher-order nonlinear combination processing and the lower-order nonlinear combination processing can be performed on the plurality of pieces of feature data, but also the linear combination processing can be performed on the plurality of pieces of feature data, to obtain the group of first auxiliary data, thereby further increasing an amount of target data based on which the prediction data is finally determined and further improving accuracy of the prediction data.

In one embodiment, the automatically performing lower-order nonlinear combination processing on the plurality of pieces of feature data to obtain the group of lower-order data includes: automatically performing lower-order nonlinear combination processing on the plurality of pieces of feature data by using a factorization machine FM-based processing module, to obtain the group of lower-order data, and the automatically performing linear combination processing on the plurality of pieces of feature data to obtain a group of first auxiliary data includes: automatically performing linear combination processing on the plurality of pieces of feature data by using the FM-based processing module, to obtain the group of first auxiliary data. Alternatively, the automatically performing lower-order nonlinear combination processing on the plurality of pieces of feature data to obtain the group of lower-order data includes: automatically performing lower-order nonlinear combination processing on the plurality of pieces of feature data by using a field-aware factorization machine FFM-based processing module, to obtain the group of lower-order data, and the automatically performing linear combination processing on the plurality of pieces of feature data to obtain a group of first auxiliary data includes: automatically performing linear combination processing on the plurality of pieces of feature data by using the FFM-based processing module, to obtain the group of first auxiliary data.

In one embodiment, before the determining prediction data based on a plurality of pieces of target data, the method further includes: determining x pieces of empirical feature data with reference to both expert experience and the plurality of pieces of feature data, where x≥1, and the x pieces of empirical feature data include: data obtained from the plurality of pieces of feature data with reference to the expert experience and/or data obtained by performing nonlinear combination processing on at least two pieces of feature data in the plurality of pieces of feature data with reference to the expert experience; and automatically processing the x pieces of empirical feature data to obtain a group of second auxiliary data, where the plurality of pieces of target data further include the group of second auxiliary data, and when x=1, the second auxiliary data is related to one piece of empirical feature data; or when x>1, the second auxiliary data is related to a linear combination of at least two pieces of empirical feature data in the x pieces of empirical feature data, and/or the second auxiliary data is related to a nonlinear combination of at least two pieces of empirical feature data in the x pieces of empirical feature data.

In other words, in this application, x pieces of empirical feature data that have great impact on the prediction data can be determined based on instruction of expert experience, and the x pieces of empirical feature data are processed, to obtain a group of second auxiliary data. In addition, the target data based on which the prediction data is finally determined further includes the second auxiliary data, thereby further increasing an amount of target data based on which the prediction data is finally determined and further improving accuracy of the prediction data.

In one embodiment, the plurality of pieces of feature data are a plurality of pieces of sparse feature data. After the obtaining a plurality of pieces of feature data, the method includes: converting the plurality of pieces of sparse feature data into a plurality of pieces of dense feature data. The automatically performing two different types of nonlinear combination processing on the plurality of pieces of feature data to obtain two groups of processed data includes: automatically performing two different types of nonlinear combination processing on the plurality of pieces of dense feature data to obtain two groups of processed data.

In other words, in this application, after the plurality of pieces of sparse feature data are obtained, the plurality of pieces of sparse feature data can be further converted, to obtain the plurality of pieces of dense feature data, and a data volume of the dense feature data is far less than a data volume of the sparse feature data, so that efficiency of processing the plurality of pieces of dense feature data is higher than efficiency of processing the plurality of pieces of sparse feature data.

According to a second aspect, a data processing apparatus is provided, where the data processing apparatus includes: an obtaining unit, configured to obtain a plurality of pieces of feature data; a nonlinear processing unit, configured to automatically perform two different types of nonlinear combination processing on the plurality of pieces of feature data to obtain two groups of processed data, where the two groups of processed data include a group of higher-order data and a group of lower-order data, the higher-order data is related to a nonlinear combination of m pieces of feature data in the plurality of pieces of feature data, and the lower-order data is related to a nonlinear combination of n pieces of feature data in the plurality of pieces of feature data, where m≥3, and m>n≥2; and a predicting unit, configured to determine prediction data based on a plurality of pieces of target data, where the plurality of pieces of target data include the two groups of processed data.

In one embodiment, the nonlinear processing unit includes: a higher-order processing subunit, configured to automatically perform higher-order nonlinear combination processing on the plurality of pieces of feature data to obtain the group of higher-order data; and a lower-order processing subunit, configured to automatically perform lower-order nonlinear combination processing on the plurality of pieces of feature data to obtain the group of lower-order data.

In one embodiment, the data processing apparatus further includes: a linear processing unit, configured to automatically perform linear combination processing on the plurality of pieces of feature data to obtain a group of first auxiliary data, where the first auxiliary data is related to a linear combination of at least two pieces of feature data in the plurality of pieces of feature data, and the plurality of pieces of target data further include at least one piece of the first auxiliary data.

In one embodiment, the data processing apparatus further includes a factorization machine FM-based processing module or a field-aware factorization machine FFM-based processing module, where the FM-based processing module includes the lower-order processing subunit and the linear processing unit, and the FFM-based processing module includes the lower-order processing subunit and the linear processing unit.

In one embodiment, the data processing apparatus further includes: a determining unit, configured to determine x pieces of empirical feature data with reference to both expert experience and the plurality of pieces of feature data, where x≥1, and the x pieces of empirical feature data include: data obtained from the plurality of pieces of feature data with reference to the expert experience and/or data obtained by performing nonlinear combination processing on at least two pieces of feature data in the plurality of pieces of feature data with reference to the expert experience; and an empirical processing unit, configured to automatically process the x pieces of empirical feature data to obtain a group of second auxiliary data, where the plurality of pieces of target data further include the group of second auxiliary data; and when x=1, the second auxiliary data is related to one piece of empirical feature data; or when x>1, the second auxiliary data is related to a linear combination of at least two pieces of empirical feature data in the x pieces of empirical feature data, and/or the second auxiliary data is related to a nonlinear combination of at least two pieces of empirical feature data in the x pieces of empirical feature data.

In one embodiment, the plurality of pieces of feature data are a plurality of pieces of sparse feature data. The data processing apparatus further includes: a conversion unit, configured to convert the plurality of pieces of sparse feature data into a plurality of pieces of dense feature data. The nonlinear processing unit is further configured to automatically perform two different types of nonlinear combination processing on the plurality of pieces of dense feature data to obtain two groups of processed data.

According to a third aspect, a computer-readable storage medium is provided, where the computer-readable storage medium stores a computer program, and when the program is executed by a processor, the data processing method in the first aspect is implemented.

According to a fourth aspect, a computer program product is provided. When the computer program product is run on a computer, the computer performs the data processing method in the first aspect.

According to a fifth aspect, a data processing apparatus is provided, where the data processing apparatus includes: at least one processor, at least one network interface, a memory, and at least one bus. The memory and the network interface are separately connected to the processor by using the bus. The processor is configured to execute an instruction stored in the memory; and the processor implements, by executing the instruction, the data processing method provided in any one of the first aspect or the implementations of the first aspect.

Technical effects obtained in the second aspect to the fifth aspect are similar to technical effects obtained through a corresponding technical means in the first aspect. Details are not described herein in this application.

The technical solutions provided in this application bring the following beneficial effects.

In the related art, one group of processed data (including at least one piece of higher-order data) can be obtained by performing one type of nonlinear combination processing (higher-order nonlinear combination processing) on the plurality of pieces of feature data. However, in this application, two groups of processed data can be obtained by automatically performing two different types of nonlinear combination processing (higher-order nonlinear combination processing and lower-order nonlinear combination processing) on the plurality of pieces of feature data. In other words, a data volume of the two groups of processed data obtained in this application is greater than a data volume of one group of processed data obtained in the related art, and a large amount of data is needed to implement accurate prediction. Therefore, prediction data obtained based on two groups of processed data in this application is more accurate than prediction data obtained based on one group of processed data in the related art.

DESCRIPTION OF EMBODIMENTS

To make the objectives, technical solutions, and advantages of this application clearer, the following further describes the implementations of this application in detail with reference to the accompanying drawings.

Figure 1:
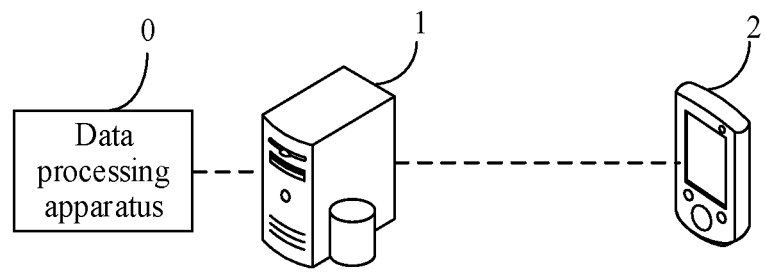
FIG. 1 is a schematic diagram of an application scenario of a data processing method according to an embodiment of the present invention.

FIG. 1 is a schematic diagram of an application scenario of a data processing method according to an embodiment of the present invention. As shown in FIG. 1, a server 1 may establish a communications connection to a plurality of clients 2, and the server 1 can obtain data related to the client 2. The client 2 can also obtain, from the server 1, data stored in the server. A data processing apparatus 0 is connected to the server 1, or the data processing apparatus 0 may be further disposed in the server 1. The data processing apparatus 0 can process data obtained by the server. For example, both a connection between the data processing apparatus 0 and the server 1 and a connection between the server 1 and the client 2 may be implemented through a wired network or a wireless network.

It should be noted that, terms such as "related to a linear combination", "related to a nonlinear combination", "linear combination processing", and "nonlinear combination processing" are used in this embodiment of the present invention. These terms are illustrated herein in this embodiment of the present invention.

For example, when combination processing (linear combination processing or nonlinear combination processing) is performed on a plurality of pieces of feature data, the combination processing may be performed on the plurality of pieces of feature data based on a preset formula. When the preset formula is a linear equation, the combination processing for the plurality of pieces of feature data is also referred to as "linear combination processing". In this case, data obtained through the combination processing is "related to a linear combination" of the plurality of pieces of feature data. When the preset formula is a nonlinear equation, the "combination processing" for the plurality of pieces of feature data is also referred to as "nonlinear combination processing". In this case, data obtained through the combination processing is "related to a nonlinear combination" of the plurality of pieces of feature data. The linear equation is a multi-variable linear equation. A relationship between an independent variable and a dependent variable in the linear equation is a linear relationship, and the linear equation is represented as a straight line in a Cartesian coordinate system. The nonlinear equation is a multi-variable higher-order equation. A relationship between an independent variable and a dependent variable in the nonlinear equation is not a linear relationship, and the nonlinear equation is represented as a curve in a Cartesian coordinate system.

For example, if the plurality of pieces of feature data include feature data a1 and feature data a2, data $y1=d1*a1+d2*a2$ can be obtained by performing linear combination processing on the plurality of pieces of feature data, where d1 is a weight of the feature data a1, d2 is a weight of the feature data a2, and y1 is related to a linear combination of the feature data a1 and the feature data a2. Data $y2=a1*a2$ can be obtained by performing nonlinear combination processing on the plurality of pieces of feature data, where y2 is related to a nonlinear combination of the feature data a1 and the feature data a2. It should be noted that, in this embodiment of the present invention, only $y1=d1*a1+d2*a2$ and $y2=a1*a2$ are used as examples to illustrate linear combination processing and nonlinear combination processing for the plurality of pieces of feature data. In actual application, data obtained through the linear combination processing may not be $d1*a1+d2*a2$, and data obtained through nonlinear combination processing may not be $a1*a2$. This is not limited in this embodiment of the present invention.

Figure 2:
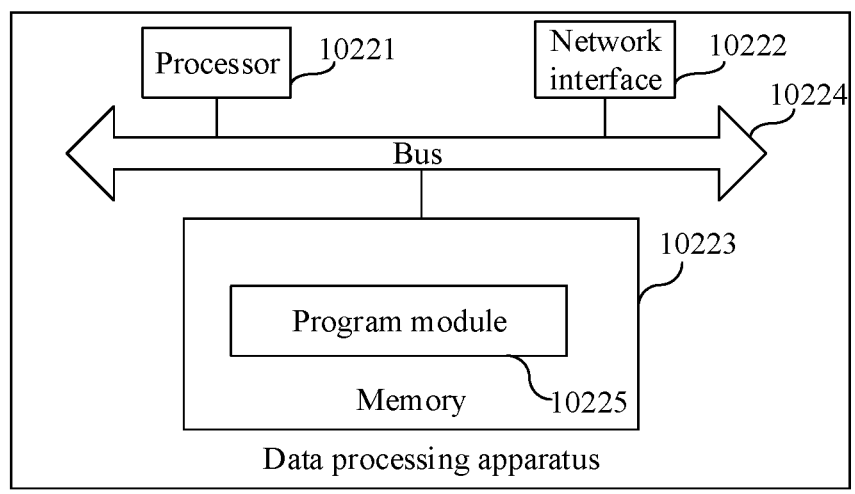
FIG. 2 is a schematic structural diagram of a data processing apparatus according to an embodiment of the present invention.

FIG. 2 is a schematic structural diagram of a data processing apparatus according to an embodiment of the present invention. In one embodiment, the data processing apparatus may be the data processing apparatus shown in FIG. 1. As shown in FIG. 2, the data processing apparatus may include at least one processor 10221 (for example, a central processing unit), at least one network interface 10222, a memory 10223, and at least one bus 10224. The bus 10224 may be configured to implement connection and communication between the processor, the network interface, and the memory. The memory 10223 and the network interface 10222 are separately connected to the processor 10221 by using the bus 10224. The processor 10221 is configured to execute an executable module stored in the memory 10223, such as a computer program. The memory 10223 may include a high-speed random access memory (RAM), and may further include a non-volatile memory, for example, at least one magnetic disk storage. A communications connection between the data processing apparatus and at least another apparatus is implemented through the at least one (wired or wireless) network interface 10222. In some implementations, the memory 10223 stores a program module 10225, and the program module 10225 can be executed by the processor 10221, to implement the data processing method shown in FIG. 4.

Figure 3:
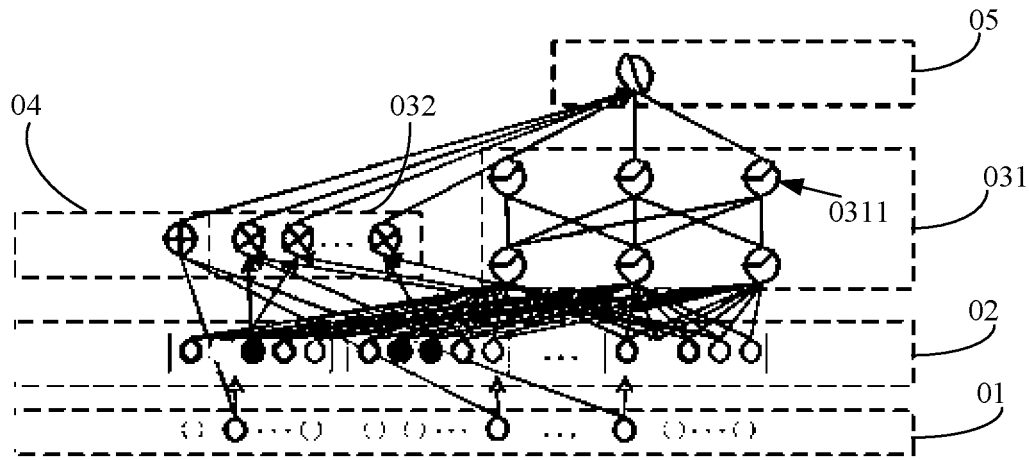
FIG. 3 is a schematic structural diagram of a program module according to an embodiment of the present invention.

For example, as shown in FIG. 3, the program module may include:

an obtaining module 01, configured to obtain a plurality of pieces of feature data, where the plurality of pieces of feature data are a plurality of pieces of sparse feature data;

a conversion module 02, configured to convert the plurality of pieces of sparse feature data into a plurality of pieces of dense feature data;

a nonlinear processing module (not marked in FIG. 3), configured to automatically perform two different types of nonlinear combination processing on the plurality of pieces of feature data to obtain two groups of processed data, where the two groups of processed data include a group of higher-order data and a group of lower-order data, the higher-order data is related to a nonlinear combination of m pieces of feature data in the plurality of pieces of feature data, and the lower-order data is related to a nonlinear combination of n pieces of feature data in the plurality of pieces of feature data, where $m≥3$, and $m>n≥2$; and the nonlinear processing module is further configured to automatically perform two different types of nonlinear combination processing on the plurality of pieces of dense feature data to obtain two groups of processed data;

a linear processing module 04, configured to automatically perform linear combination processing on the plurality of pieces of feature data to obtain a group of first auxiliary data, where the first auxiliary data is related to a linear combination of at least two pieces of feature data in the plurality of pieces of feature data, and a plurality of pieces of target data include at least one piece of the first auxiliary data; and a predicting module 05, configured to determine prediction data based on the plurality of pieces of target data, where the plurality of pieces of target data include the two groups of processed data.

In one embodiment, the nonlinear processing module may include a higher-order processing sub-module 031 and a lower-order processing sub-module 032. The higher-order processing sub-module 031 may be configured to automatically perform higher-order nonlinear combination processing on the plurality of pieces of feature data to obtain a group of higher-order data. The lower-order processing sub-module 032 may be configured to automatically perform lower-order nonlinear combination processing on the plurality of pieces of feature data to obtain a group of lower-order data.

In one embodiment, the program module may further include a factorization machine (FM)-based processing module or a field-aware factorization machine (FFM)-based processing module, where the FM-based processing module includes the lower-order processing sub-module 032 and the linear processing module 04, and the FFM-based processing module includes the lower-order processing sub-module 032 and the linear processing module 04.

In one embodiment, the program module may further include a determining module and an empirical processing module (not shown in FIG. 3). The determining module may be configured to determine x pieces of empirical feature data with reference to both expert experience and the plurality of pieces of feature data, where $x≥1$, and the x pieces of empirical feature data include: data obtained from the plurality of pieces of feature data with reference to the expert experience and/or data obtained by performing nonlinear combination processing on at least two pieces of feature data in the plurality of pieces of feature data with reference to the expert experience. The empirical processing module may be configured to automatically process the x pieces of empirical feature data to obtain a group of second auxiliary data. The plurality of pieces of target data further include the group of second auxiliary data. When x=1, the second auxiliary data is related to one piece of empirical feature data. When x>1, the second auxiliary data is related to a linear combination of at least two pieces of empirical feature data in the x pieces of empirical feature data, and/or the second auxiliary data is related to a nonlinear combination of at least two pieces of empirical feature data in the x pieces of empirical feature data.

Figure 4:
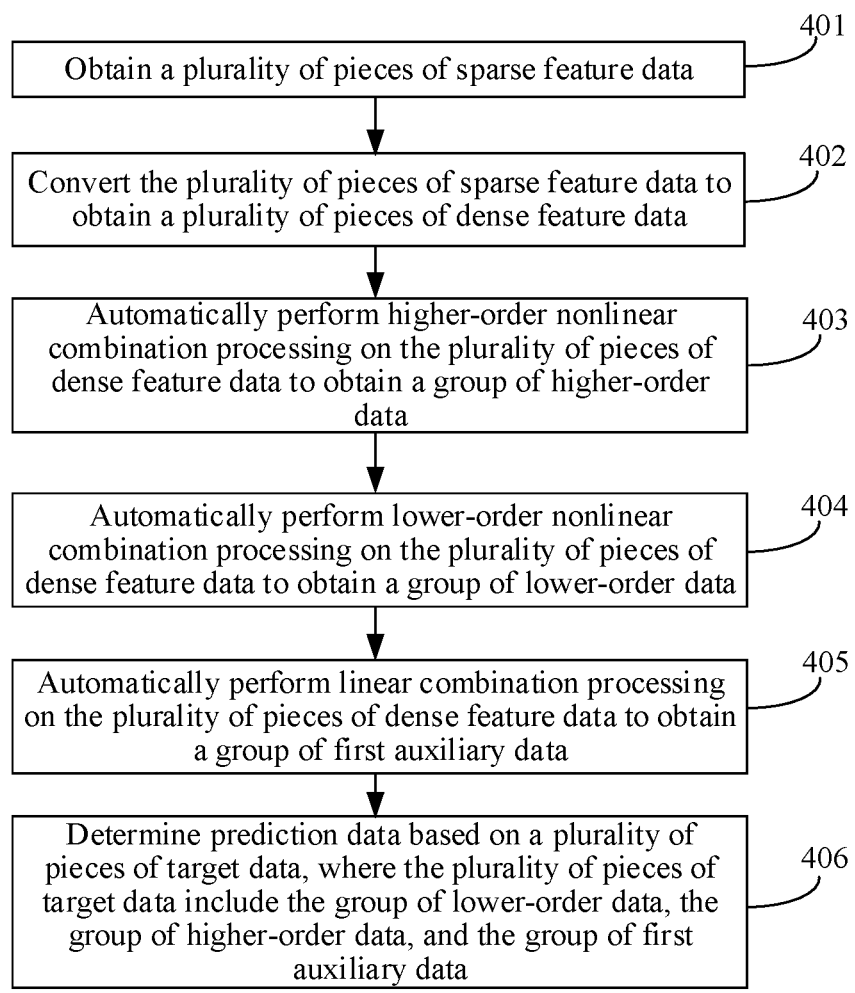
FIG. 4 is a method flowchart of a data processing method according to an embodiment of the present invention.

FIG. 4 is a method flowchart of a data processing method according to an embodiment of the present invention. The data processing method may be used for the data processing apparatus shown in FIG. 2. As shown in FIG. 4, the data processing method may include the following operations.

Operation 401: Obtain a plurality of pieces of sparse feature data.

When people analyze an object that can dynamically change (for example, a quantity of access times for a specific website, a quantity of download times for a specific file, a click-through rate of an icon of a specific application in an application store, or a click-through rate of a specific video on a video website), a plurality of pieces of sparse feature data of the object may be usually obtained.

For example, icons of a plurality of applications are displayed on a client of an application store, and when a user needs to download a specific application, the user may tap, in the plurality of applications, an icon of the application that needs to be downloaded, to enter a download interface of the application and decide whether to download the application. Therefore, whether the user is to download the application is related to whether the user is to tap the icon of the application. A server of the application store may determine a recommendation priority of the application based on a click-through rate (CTR) of the icon of the application, and allocate a higher priority to the application with a high click-through rate. Correspondingly, icons of these applications are preferentially displayed in the application store, to accurately recommend, to the user in a timely manner, an application that meets a user requirement, thereby improving user loyalty. In this scenario, it is particularly important to predict the click-through rate of the icon of the application. When the click-through rate of the icon of the application needs to be predicted, the plurality of pieces of sparse feature data obtained by the data processing apparatus in operation 401 may be sparse feature data of the application. The sparse feature data of the application includes attribute data of the user and attribute data of the application. The attribute data of the user may include attribute data such as an identifier of the user, a gender of the user, an age of the user, an occupation of the user, an income of the user, a hobby of the user, and education of the user. The attribute data of the application may include attribute data such as an identifier of the application, a name of the application, a developer of the application, a type of the application, an installation package size of the application, a tag of the application, an application rating, and an application comment. For example, in sparse feature data of a specific application, the identifier of a user is Xiaoming, the gender of the user is male, the age of the user is 20, the name of the application is F1, and the type of the application is a chat application. The sparse feature data obtained in operation 401 may be arranged according to a specific rule, for example, "Xiaoming, male, 20, F1, and chat".

For another example, after the user logs in to a website by using a terminal and searches for a specific keyword in a website from which a file can be downloaded, the website may control, based on the keyword, the terminal to display entries of a plurality of files related to the keyword, and the user may click an entry of a specific file according to a requirement, to download the file. For example, a file that is downloaded a plurality of times usually better meets download requirements of a plurality of users. Therefore, the website may determine the recommendation priority of the file according to a quantity of download times of the file, allocate a relatively high priority to a file with a high quantity of download times, and correspondingly control the terminal to preferentially display the entries of these files. When people need to analyze the quantity of download times of a specific file, people may obtain the plurality of pieces of sparse feature data of the file. For example, the plurality of pieces of sparse feature data of the file may include a name of the file, a size of the file, and a tag of the file. For example, in sparse feature data of a specific file, the name of the file is F2, the size of the file is 2 MB, and the tag of the file is technology. The sparse feature data obtained in operation 401 may be arranged according to a specific rule, for example, "F2, 2 MB, and technology".

As shown in FIG. 3, the program module in the data processing apparatus may include an obtaining module. In operation 401, the data processing apparatus may obtain the plurality of pieces of sparse feature data by using the obtaining module.

Operation 402: Convert the plurality of pieces of sparse feature data to obtain a plurality of pieces of dense feature data.

After obtaining the plurality of pieces of sparse feature data with relatively large data volumes, the data processing apparatus may convert the plurality of pieces of sparse feature data to obtain a plurality of pieces of dense feature data with relatively small data volumes, and a data volume of the dense feature data is far less than a data volume of the sparse feature data, so that efficiency of subsequently processing the plurality of pieces of dense feature data by the data processing apparatus is higher than efficiency of processing the plurality of pieces of sparse feature data by the data processing apparatus.

As shown in FIG. 3, the program module in the data processing apparatus may further include a conversion module. In operation 402, the data processing apparatus may convert, by using the conversion module, the plurality of pieces of sparse feature data obtained by the obtaining module, to obtain a plurality of pieces of dense feature data.

Operation 403: Automatically perform higher-order nonlinear combination processing on the plurality of pieces of dense feature data to obtain a group of higher-order data.

After obtaining the plurality of pieces of dense feature data, the data processing apparatus can perform higher-order nonlinear combination processing on the plurality of pieces of entered dense feature data to obtain the group of higher-order data. Each piece of higher-order data is related to a nonlinear combination of m pieces of feature data in the plurality of pieces of dense feature data. M is any integer greater than or equal to 3. In other words, the group of higher-order data may include a plurality of pieces of higher-order data related to a nonlinear combination of at least three pieces of feature data. For example, m is 5, 6, or 7. In this case, the group of higher-order data includes: higher-order data related to a nonlinear combination of five pieces of feature data, higher-order data related to a nonlinear combination of six pieces of feature data, and higher-order data related to a nonlinear combination of seven pieces of feature data.

In one embodiment, the program module in the data processing apparatus may further include a nonlinear processing module, and the nonlinear processing module includes a higher-order processing sub-module. In operation 403, the data processing apparatus may automatically perform higher-order nonlinear combination processing on a plurality of pieces of dense feature data by using the higher-order processing sub-module, to obtain a group of higher-order data. For example, the higher-order processing sub-module may be a deep neural network (DNN)-based processing sub-module, a processing sub-module based on a factorization-machine supported neural network (FNN), or a processing sub-module based on a product-based neural network (PNN).

In a first implementation, as shown in FIG. 3, the higher-order processing sub-module may be the DNN-based processing sub-module, and the DNN-based processing sub-module may include a plurality of cascaded first processing units 0311. The DNN-based processing sub-module includes a total of (H+1) layers of first processing units (FIG. 3 shows examples of two layers of first processing units 0311), and a first processing unit at a first layer is connected to a conversion module 02 and a first processing unit at a non-first layer; a first processing unit at an $i^{th}$ layer is connected to a first processing unit at an $(i-1)^{th}$ layer and a first processing unit at an $(i+1)^{th}$ layer; and a first processing unit at an $(H+1)^{th}$ layer is connected to a first processing unit at an $H^{th}$ layer and a prediction module 05 that is in the data processing apparatus and that is finally configured to determine prediction data, where i is an integer greater than 1 and less than H+1, and H is an integer greater than or equal to 1. The plurality of pieces of dense feature data from the conversion module 02 may be input to the first processing unit at the first layer. A first processing unit 021 at each layer may perform nonlinear combination processing on the input data, and processed data is input to a first processing unit 021 at a next layer. After performing nonlinear combination processing on the input data, each first processing unit at the $(H+1)^{th}$ layer can output one piece of higher-order data to the prediction module 05. Each piece of higher-order data is related to a nonlinear combination of m pieces of feature data in the plurality of pieces of dense feature data obtained by the data processing apparatus.

It should be noted that, in the plurality of cascaded first processing units, any two connected first processing units share one connection used for connecting the two first processing units, and the connection has a preset weight. A connection of the first processing unit at the $(H+1)^{th}$ layer and the prediction module and a connection of the first processing unit at the first layer and the conversion module also each have a preset weight. Data processed by each first processing unit is data input into the first processing unit by using a connection and data obtained through calculation based on a weight of the connection.

In a second implementation, the higher-order processing sub-module may be the DNN-based processing sub-module, and the DNN-based processing sub-module may include a plurality of cascaded second processing units. It is assumed that the DNN-based processing sub-module includes a total of (H+1) layers of second processing units, and a group of higher-order data obtained after the higher-order processing sub-module automatically performs higher-order nonlinear combination processing on the plurality of pieces of dense feature data is $y_{DNN}^i = \sigma(W^{H+1}a^H + b^{H+1})$, where $\sigma(x)$ is an activation function, $a^H$ is a vector in which data processed by a second processing unit at an $H^{th}$ layer is used as an element, $b^{H+1}$ is an offset item of a second processing unit at an $(H+1)^{th}$ layer, and $W^{H+1}$ is a matrix in which a weight of a connection of the second processing unit at the $H^{th}$ layer and the second processing unit at the $(H+1)^{th}$ layer is used as an element. For example, the activation function may be a sigmoid function (also referred to as an S-shaped function), a rectified linear unit (ReLU) function, a hyperbolic tangent (tanh) function, or the like.

Second processing units at the $H^{th}$ layer include a total of $m_H$ second processing units, and data processed by each of the $m^H$ second processing units is a real number. Second processing units at the $(H+1)^{th}$ layer include a total of $m_{H+1}$ second processing units, and data processed by each of the $m_{H+1}$ second processing units is a real number. All weights of connections of the second processing units at the $H^{th}$ layer and the second processing units at the $(H+1)^{th}$ layer include a total of $m_H \times m_{H+1}$ real numbers. l is an integer that is greater than or equal to 1 and less than or equal to H. $a^l$ is a vector in which data processed by each second processing unit at an $l^{th}$ layer is used as an element, and $b^{l+1}$ is an offset item of a second processing unit at an $(l+1)^{th}$ layer. $W^{l+1}$ is a vector in which a weight at each connection of the second processing unit at the $l^{th}$ layer and the second processing unit at the $(l+1)^{th}$ layer is used as an element, $a^{l+1}$ is a vector in which data processed by each second processing unit at the $(l+1)^{th}$ layer is used as an element, and $a^{l+1} = \sigma(W^{l+1}a^l + b^{l+1})$.

Operation 404: Automatically perform lower-order nonlinear combination processing on the plurality of pieces of dense feature data to obtain a group of lower-order data.

After obtaining the plurality of pieces of dense feature data, the data processing apparatus can further perform lower-order nonlinear combination processing on the plurality of pieces of entered dense feature data to obtain the group of lower-order data. Each piece of lower-order data is related to a nonlinear combination of n pieces of feature data in the plurality of pieces of dense feature data, where n is any integer greater than or equal to 2 and less than m. For example, m is 5, 6, or 7. In this case, n may be 2, 3, or 4, and the group of lower-order data includes: lower-order data related to a nonlinear combination of two pieces of feature data, lower-order data related to a nonlinear combination of three pieces of feature data, and lower-order data related to a nonlinear combination of four pieces of feature data.

Operation 405: Automatically perform linear combination processing on the plurality of pieces of dense feature data to obtain a group of first auxiliary data.

After obtaining the plurality of pieces of dense feature data, the data processing apparatus can further perform linear combination processing on the plurality of pieces of entered dense feature data to obtain the group of first auxiliary data. Each piece of first auxiliary data is related to a linear combination of at least two pieces of feature data in the plurality of pieces of dense feature data. For example, the group of first auxiliary data may include: first auxiliary data related to a linear combination of two pieces of feature data, first auxiliary data related to a linear combination of three pieces of feature data, and first auxiliary data related to a linear combination of four pieces of feature data.

It should be noted that in operation 404, the data processing apparatus may automatically perform lower-order nonlinear combination processing on the plurality of pieces of dense feature data by using a lower-order processing sub-module in the data processing apparatus, to obtain the group of lower-order data. In operation 405, the data processing apparatus may automatically perform linear combination processing on the plurality of pieces of dense feature data by using a linear processing module in the data processing apparatus, to obtain the group of first auxiliary data.

Further, program module in the data processing apparatus shown in FIG. 3 may further include an FM-based processing module or an FFM-based processing module. The FM-based processing module includes: a lower-order processing sub-module 032 and a linear processing module 04. The FFM-based processing module includes: a lower-order processing sub-module 032 and a linear processing module 04. In other words, when operation 404 and operation 405 are performed, the data processing apparatus may separately perform lower-order nonlinear combination processing and linear combination processing directly on the plurality of pieces of dense feature data by using the FM-based processing module or the FFM-based processing module, to obtain the group of lower-order data and the group of first auxiliary data.

In a first implementation, the data processing apparatus may separately perform lower-order nonlinear combination processing and linear combination processing directly on the plurality of pieces of dense feature data by using the FM-based processing module, to obtain the group of lower-order data and the group of first auxiliary data. Data processed by using the FM-based processing module may be denoted as $y_{FM}^i$, where $y_{FM}^i$ includes the group of lower-order data and the group of first auxiliary data. The group of lower-order data is $$\sum_{a=1}^{n-1} \sum_{b=a+1}^{n} (V_a \cdot V_b) X_{i,a} X_{i,b},$$

the group of first auxiliary data is $$\sum_{j=1}^{n} w_j X_{i,j}, \text{ and } y_{FM}^i = \sum_{j=1}^{n} w_j X_{i,j} + \sum_{a=1}^{n-1} \sum_{b=a+1}^{n} (V_a \cdot V_b) X_{i,a} X_{i,b}.$$

Herein, n is a quantity of a plurality of pieces of dense feature data obtained by the obtaining module. $V_a$ is an implicit vector of an $a^{th}$ piece of feature data in the plurality of pieces of dense feature data, $1 \le a \le n-1$, $V_a$ has a specified dimension, and each element in $V_a$ is a real number. $V_b$ is an implicit vector of a $b^{th}$ piece of feature data in the plurality of pieces of dense feature data, $a+1 \le b \le n$, $V_b$ has a specified dimension, and each element in $V_b$ is a real number. $X_{i,a}$ is the $a^{th}$ piece of feature data in the plurality of pieces of dense feature data, $X_{i,b}$ is the $b^{th}$ piece of feature data in the plurality of pieces of dense feature data, $X_{i,j}$ is a $j^{th}$ piece of feature data in the plurality of pieces of dense feature data, $1 \le j \le n$, and $w_j$ is a weight of the $j^{th}$ piece of feature data.

In a second implementation, the data processing apparatus may separately perform lower-order nonlinear combination processing and linear combination processing directly on the plurality of pieces of dense feature data by using the FFM-based processing module, to obtain the group of lower-order data and the group of first auxiliary data. Data processed by using the FFM-based processing module may be denoted as $y_{FFM}^i$, where $y_{FFM}^i$ includes the group of lower-order data and the group of first auxiliary data. The group of lower-order data is $$\sum_{a=1}^{n-1} \sum_{b=a+1}^{n} (V_{a,f_b} \cdot V_{b,f_a}) X_{i,a} X_{i,b},$$

the group of first auxiliary data is $$\sum_{j=1}^{n} w_j X_{i,j}, \text{ and } y_{FFM}^i = \sum_{j=1}^{n} w_j X_{i,j} + \sum_{a=1}^{n-1} \sum_{b=a+1}^{n} (V_{a,f_b} \cdot V_{b,f_a}) X_{i,a} X_{i,b}.$$

Herein, a function $f_a$ represents a field to which an $a^{th}$ piece of feature data in the plurality of pieces of dense feature data belongs, a function $f_b$ represents a field to which a $b^{th}$ piece of feature data in the plurality of pieces of entered dense feature data belongs. $V_{a,f_b}$ is an implicit vector of the $a^{th}$ piece of feature data in the plurality of pieces of dense feature data for $f_b$, $V_{a,f_b}$ has a specified dimension, and each element in $V_{a,f_b}$ is a real number. $V_{b,f_a}$ is an implicit vector of the $b^{th}$ piece of feature data in the plurality of pieces of dense feature data for $f_a$, $V_{b,f_a}$ has a specified dimension, and each element in $V_{b,f_a}$ is a real number.

Operation 406: Determine prediction data based on a plurality of pieces of target data, where the plurality of pieces of target data include the group of lower-order data, the group of higher-order data, and the group of first auxiliary data.

After obtaining the group of lower-order data, the group of higher-order data, and the group of first auxiliary data, the data processing apparatus may determine the prediction data based on the plurality of pieces of target data including the group of lower-order data, the group of higher-order data, and the group of first auxiliary data. For example, still referring to FIG. 3, the program module in the data processing apparatus may further include a prediction module 05. In operation 406, the data processing apparatus may determine the prediction data by using the prediction module 05. In one embodiment, the prediction data determined by the prediction module may be $\overline{y}_i$, $\overline{y}_i$=sigmoid $(y_{FM}^i+y_{DNN}^i)$, and $$\text{sigmoid}(x) = \frac{1}{1+e^{-x}}.$$

For example, when the plurality of pieces of sparse feature data obtained in operation 401 are sparse feature data of the application (including attribute data of a user and attribute data of the application), the prediction data obtained by the data processing apparatus in operation 406 may be used to indicate a click-through rate of an icon of the application. It should be noted that, as shown in FIG. 1, a server 1 (a server of the application store) may analyze the user and each application in the application store by using a data processing apparatus 0, to determine, a user click-through rate of an icon of each application in the application store. In addition, the server 1 sorts the plurality of applications based on the click-through rate of the icon of each application, and sends information about a corresponding application store interface to a client 2 (a client of the application store). The client 2 displays the application store interface based on the information, and icons of the applications displayed in the interface are arranged in the foregoing determined sequence.

In other words, the server 1 re-sorts icons of all applications for each user, and therefore, sorting of all the applications, used by each user, in the client of the application store is related to the attribute feature of the user, and sorting of the applications can better meet a need of each user. For example, it is assumed that the application store includes four applications that are respectively an application Q1, an application Q2, an application Q3, and an application Q4. After sparse feature data of the applications is processed, the data processing apparatus determines that a user click-through rate of an icon of the application Q1 ranks top, followed by those of an icon of the application Q2, an icon of the application Q3, and an icon of the application Q4. The server may arrange the icons of the four applications in a sequence of the icon of the application Q1, the icon of the application Q2, the icon of the application Q3, and the icon of the application Q4, so that the icons of the four applications displayed in the application store interface displayed on the client are arranged in a sequence of the icon of the application Q1, the icon of the application Q2, the icon of the application Q3, and the icon of the application Q4.

Further, to improve accuracy of the prediction data obtained by the data processing apparatus, before the data processing apparatus performs operation 401, the server may obtain a plurality of pieces of training data, and may train the data processing apparatus based on the plurality of pieces of data by using a training apparatus, to adjust a weight used by the data processing apparatus during data processing. For example, each piece of training data may include a group of sparse feature data and click data corresponding to the group of sparse feature data.

A user P and an application Q are used as an example. The group of sparse feature data in one piece of training data may include attribute data of the user P and attribute data of the application Q. Click data in the piece of training data may include an identifier of the user P, an identifier of the application Q, and indication data used to indicate whether the user P clicks an icon of the application Q. In one embodiment, the click data in the training data may further include context information when statistics about the piece of training data are collected, for example, a time of collecting statistics about the piece of training data, a weather condition when statistics about the piece of training data are collected, a traffic condition when statistics about the piece of training data are collected, and a network connection status when statistics about the piece of training data are collected. The identifier of the user P may be identification (ID) of the user P, and the identifier of the application Q may be an ID of the application Q.

When training the data processing apparatus, the training apparatus may first input a plurality groups of sparse feature data in a plurality of pieces of training data into the obtaining module in the data processing apparatus, and the data processing apparatus can sequentially process each group of input sparse feature data, to obtain a piece of prediction data. The prediction data is used to indicate whether the user clicks an icon of the application. The training apparatus can further compare the prediction data that is obtained by the data processing apparatus based on the group of sparse feature data with the click data corresponding to the group of sparse feature data, and determine whether the prediction data and the click data both indicate that the user clicks the icon of the application or that the user does not click the icon of the application. If the prediction data and the click data do not simultaneously indicate that the user clicks the icon of the application or that the user does not click the icon of the application, the training apparatus needs to adjust the weight used by the data processing apparatus during data processing. After training of the data processing apparatus is completed by using the training apparatus, the weight used by the data processing apparatus during data processing has been adjusted a plurality of times, and the data processing apparatus can process the plurality of pieces of sparse feature data to obtain relatively accurate prediction data.

In addition, after a plurality of pieces of feature data are obtained, if an amount of higher-order data obtained by performing higher-order nonlinear combination processing on some feature data in the plurality of pieces of feature data is a first amount, and an amount of lower-order data obtained by performing lower-order nonlinear combination processing on some other feature data in the plurality of pieces of feature data is a second amount, an amount of target data based on which the prediction data is finally determined is equal to a sum of the first amount and the second amount. If higher-order nonlinear combination processing is performed on the plurality of pieces of data, an amount of obtained higher-order data is greater than the first amount, and lower-order nonlinear combination processing is also performed on the plurality of pieces of data, an amount of obtained lower-order data is greater than the second amount, and therefore, an amount of target data based on which the prediction data is finally determined is greater than the sum of the first amount and the second amount. In other words, when the higher-order nonlinear combination processing and the lower-order nonlinear combination processing are separately performed on the plurality of pieces of feature data, there is a relatively great amount of target data based on which the prediction data is finally determined, and the prediction data is more accurate. Therefore, in this embodiment of the present invention, all dense feature data obtained in operation 402 is processed in operation 403, operation 404, and operation 405, so that there is a relatively great amount of target data based on which the prediction data in operation 406 is finally determined and the prediction data obtained in operation 406 is more accurate.

In one embodiment, the program module in the data processing apparatus shown in FIG. 3 may further include a determining module and an empirical processing module. Before operation 406, the data processing apparatus may further determine x pieces of empirical feature data with reference to both expert experience and the plurality of pieces of dense feature data by using the determining module, and automatically process the x pieces of empirical feature data by using the empirical processing module, to obtain a group of second auxiliary data. In operation 406, the plurality of pieces of target data used by the prediction module in the program module in the data processing apparatus to determine the prediction data may further include the group of second auxiliary data. In other words, the plurality of pieces of target data may include: the group of higher-order data, the group of lower-order data, the group of first auxiliary data, and the group of second auxiliary data.

For example, x is an integer greater than or equal to 1, and x pieces of empirical feature data include data obtained from the plurality of pieces of dense feature data with reference to the expert experience, and/or data obtained by performing nonlinear combination processing on at least two pieces of feature data in the plurality of pieces of dense feature data with reference to the expert experience. When x=1, the second auxiliary data is related to one piece of empirical feature data. When x>1, the second auxiliary data is related to a linear combination of at least two pieces of empirical feature data in the x pieces of empirical feature data, and/or the second auxiliary data is related to a nonlinear combination of at least two pieces of empirical feature data in the x pieces of empirical feature data.

In one embodiment, the "expert" mentioned in this embodiment of the present invention refers to one or more persons skilled in the field of computer technologies, and the "expert" knows all common technical knowledge in the field of computer technologies, can learn the prior art in the field of computer technologies, and has a capability of implementing conventional experimental means. The "expert experience" mentioned in this embodiment of the present invention is a "preset formula" determined by the "expert". That the determining module determines x pieces of empirical feature data with reference to both the "expert experience" and the plurality of pieces of dense feature data includes: The determining module substitutes the plurality of pieces of dense feature data into a "preset formula" as an independent variable of the "preset formula", and the result obtained according to the preset formula is the x pieces of empirical feature data. For example, it is assumed that the plurality of pieces of dense feature data are a total of 10 pieces of data: data a1, data a2, data a3, data a4, data a5, data a6, data a7, data a8, data a9, and data a10. The determining module may obtain the data a1 from the plurality of pieces of dense feature data with reference to the expert experience, and use the data a1 as one piece of empirical feature data. Alternatively, the determining module may perform nonlinear combination processing on the data a9 and the data a10 in the plurality of pieces of dense feature data with reference to the expert experience, to obtain one piece of empirical feature data. Alternatively, the determining module obtains the data a1, uses the data a1 as one piece of empirical feature data, and performs nonlinear combination processing on the data a9 and the data a10 with reference to the expert experience to obtain another piece of empirical feature data.

After the determining module obtains the x pieces of empirical feature data, the empirical processing unit can further automatically process the x pieces of empirical feature data, to obtain a group of second auxiliary data. It should be noted that, when x=1, the second auxiliary data is related to one piece of empirical feature data, or when x>1, the second auxiliary data is related to a linear combination and/or a nonlinear combination of at least two pieces of empirical feature data in the x pieces of empirical feature data. For example, when x>1, the second auxiliary data is related to a linear combination of at least two pieces of empirical feature data in the x pieces of empirical feature data. Alternatively, the second auxiliary data is related to a nonlinear combination of at least two pieces of empirical feature data in the x pieces of empirical feature data. Alternatively, the second auxiliary data is related to both a linear combination and a nonlinear combination of at least two pieces of empirical feature data. In one embodiment, the empirical processing module may be a logistic regression (LR)-based processing module, an FM-based processing module, an FFM-based processing module, or a DNN-based processing module.

It should be noted that, when the empirical processing module processes the plurality of pieces of dense feature data, the expert experience needs to be used as reference. However, when the nonlinear processing module and the linear processing module process the plurality of pieces of dense feature data, the feature data can be automatically processed without a need to use the expert experience as reference.

In addition, to verify accuracy of prediction data obtained by the data processing apparatus provided in this embodiment of the present invention, the data processing apparatus provided in this embodiment of the present invention and the data processing apparatus in the related art are separately tested for a plurality of times by using a plurality of pieces of training data and a plurality groups of detection data in this embodiment of the present invention. In addition, the data processing apparatus in this embodiment of the present invention is compared with the data processing apparatus in the related art by using an area under the receiver operating characteristic (ROC) curve (Area under the ROC curve, AUC) and a logarithmic loss function (Logloss). After comparison, it is learned that the prediction data obtained by the data processing apparatus provided in this embodiment of the present invention is more accurate than the prediction data obtained by the data processing apparatus in the related art.

For example, when a click-through rate of an icon of an application Q needs to be predicted, it may be learned, based on the foregoing data processing method, that the data processing apparatus may obtain a plurality of pieces of sparse feature data of the application Q, and convert the plurality of pieces of sparse feature data to obtain a plurality of pieces of dense feature data of the application Q. Then, the data processing apparatus further automatically performs higher-order nonlinear combination processing, lower-order nonlinear combination processing, and linear combination processing separately on the plurality of pieces of dense feature data of the application Q, to obtain a group of higher-order data, a group of lower-order data, and a group of first auxiliary data. Further, the data processing apparatus may further determine x pieces of empirical feature data with reference to both the expert experience and the plurality of pieces of dense feature data of the application Q, and automatically process the x pieces of empirical feature data to obtain a group of second auxiliary data. Finally, the data processing apparatus determines the prediction data based on a plurality of pieces of target data including the group of higher-order data, the group of lower-order data, the group of first auxiliary data, and the group of second auxiliary data. The prediction data may be used to indicate a click-through rate of the icon of the application Q.

In conclusion, in the data processing method provided in this embodiment of the present invention, two different types of nonlinear combination processing (higher-order nonlinear combination processing and lower-order nonlinear combination processing) can be automatically performed on the feature data and two groups of processed data are obtained. However, in the related art, one group of processed data (including at least one piece of higher-order data) can be obtained by performing one type of nonlinear combination processing (higher-order nonlinear combination processing) on feature data. In other words, a data volume of the two groups of processed data obtained in this embodiment of the present invention is greater than a data volume of one group of processed data obtained in the related art, and a large amount of data is needed to implement accurate prediction. Therefore, prediction data obtained based on two groups of processed data in this embodiment of the present invention is more accurate than prediction data obtained based on one group of processed data in the related art.

Further, in this embodiment of the present invention, the target data based on which the prediction data is finally determined may further include: the group of first auxiliary data and the group of second auxiliary data. In other words, the target data in this embodiment of the present invention may include a total of four groups of data: the group of higher-order data, the group of lower-order data, the group of first auxiliary data, and the group of second auxiliary data, thereby further increasing an amount of the target data based on which the prediction data is finally determined and further improving accuracy of the prediction data.

Figure 5:
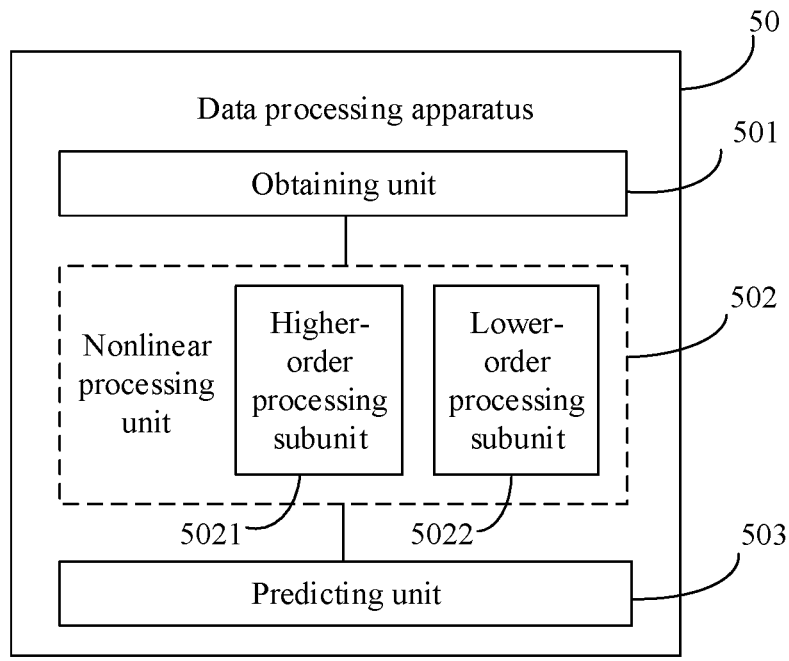
FIG. 5 is a schematic structural diagram of another data processing apparatus according to an embodiment of the present invention.

FIG. 5 is a schematic structural diagram of another data processing apparatus according to an embodiment of the present invention. The data processing apparatus may be the data processing apparatus shown in FIG. 1. As shown in FIG. 5, the data processing apparatus 50 may include:

an obtaining unit 501, configured to obtain a plurality of pieces of feature data;

a nonlinear processing unit 502, configured to automatically perform two different types of nonlinear combination processing on the plurality of pieces of feature data to obtain two groups of processed data, where the two groups of processed data include a group of higher-order data and a group of lower-order data, the higher-order data is related to a nonlinear combination of m pieces of feature data in the plurality of pieces of feature data, and the lower-order data is related to a nonlinear combination of n pieces of feature data in the plurality of pieces of feature data, where m≥3, and m>n≥2; and a predicting unit 503, configured to determine prediction data based on a plurality of pieces of target data, where the plurality of pieces of target data include the two groups of processed data.

In conclusion, based on the data processing apparatus provided in this embodiment of the present invention, the nonlinear processing unit can automatically perform two different types of nonlinear combination processing (higher-order nonlinear combination processing and lower-order nonlinear combination processing) on the feature data to obtain two groups of processed data. However, in the related art, one group of processed data (including at least one piece of higher-order data) can be obtained by performing one type of nonlinear combination processing (higher-order nonlinear combination processing) on feature data. In other words, a data volume of the two groups of processed data obtained in this embodiment of the present invention is greater than a data volume of one group of processed data obtained in the related art, and a large amount of data is needed to implement accurate prediction. Therefore, prediction data obtained based on two groups of processed data in this embodiment of the present invention is more accurate than prediction data obtained based on one group of processed data in the related art.

In one embodiment, still referring to FIG. 5, the nonlinear processing unit 502 may include:

a higher-order processing subunit 5021, configured to automatically perform higher-order nonlinear combination processing on the plurality of pieces of feature data to obtain a group of higher-order data; and a lower-order processing subunit 5022, configured to automatically perform lower-order nonlinear combination processing on the plurality of pieces of feature data to obtain a group of lower-order data.

Figure 6:
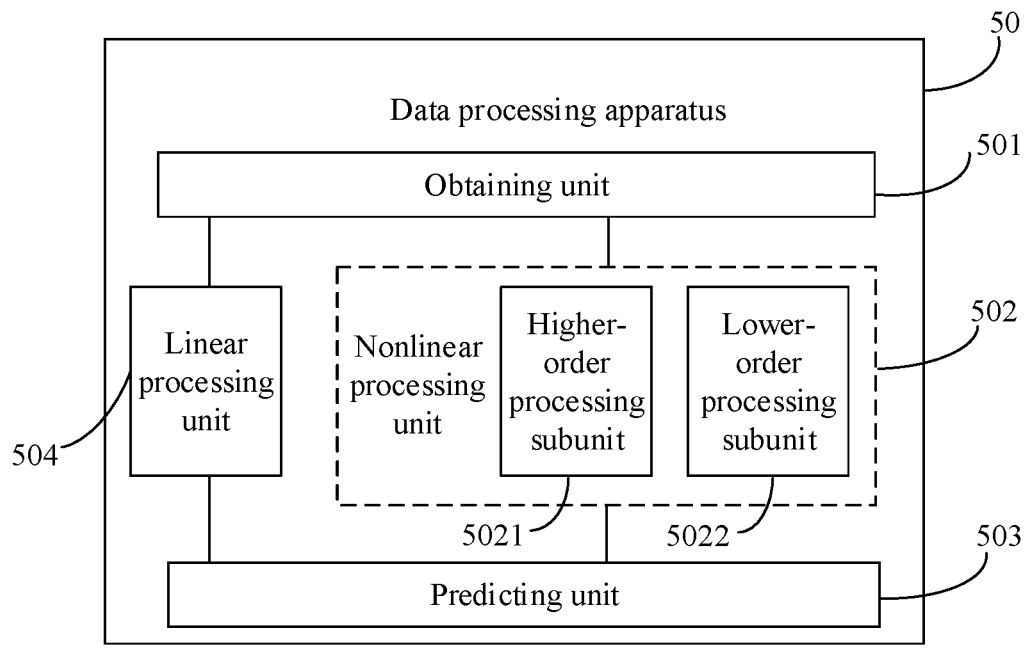
FIG. 6 is a schematic structural diagram of still another data processing apparatus according to an embodiment of the present invention.

In one embodiment, FIG. 6 is a schematic structural diagram of still another data processing apparatus according to an embodiment of the present invention. As shown in FIG. 6, based on FIG. 5, the data processing apparatus 50 may further include:

a linear processing unit 504, configured to automatically perform linear combination processing on the plurality of pieces of feature data to obtain a group of first auxiliary data, where the first auxiliary data is related to a linear combination of at least two pieces of feature data in the plurality of pieces of feature data, and a plurality of pieces of target data further include at least one piece of the first auxiliary data.

In one embodiment, the data processing apparatus further includes a factorization machine FM-based processing module or a field-aware factorization machine FFM-based processing module, where the FM-based processing module includes the lower-order processing subunit and the linear processing unit, and the FFM-based processing module includes the lower-order processing subunit and the linear processing unit.

Figure 7:
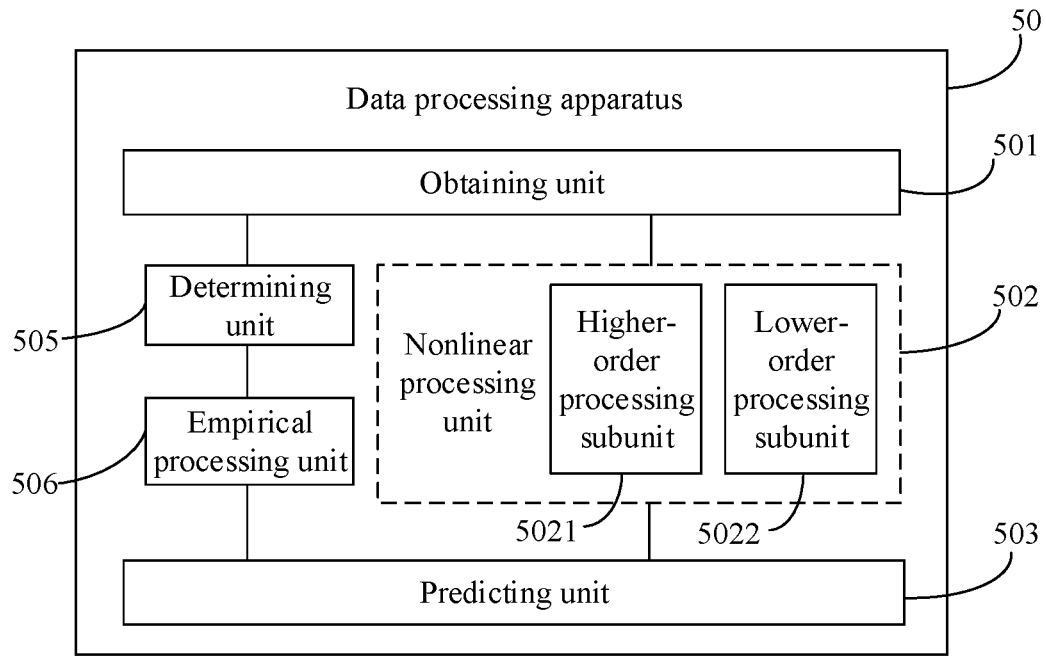
FIG. 7 is a schematic structural diagram of yet another data processing apparatus according to an embodiment of the present invention.

In one embodiment, FIG. 7 is a schematic structural diagram of yet another data processing apparatus according to an embodiment of the present invention. As shown in FIG. 7, based on FIG. 5, the data processing apparatus 50 may further include:

a determining unit 505, configured to determine x pieces of empirical feature data with reference to both expert experience and the plurality of pieces of feature data, where x≥1, and the x pieces of empirical feature data include: data obtained from the plurality of pieces of feature data with reference to the expert experience and/or data obtained by performing nonlinear combination processing on at least two pieces of feature data in the plurality of pieces of feature data with reference to the expert experience; and an empirical processing unit 506, configured to automatically process the x pieces of empirical feature data to obtain a group of second auxiliary data, where the plurality of pieces of target data further include the group of second auxiliary data; and when x=1, the second auxiliary data is related to one piece of empirical feature data; or when x>1, the second auxiliary data is related to a linear combination of at least two pieces of empirical feature data in the x pieces of empirical feature data, and/or the second auxiliary data is related to a nonlinear combination of at least two pieces of empirical feature data in the x pieces of empirical feature data.

Figure 8:
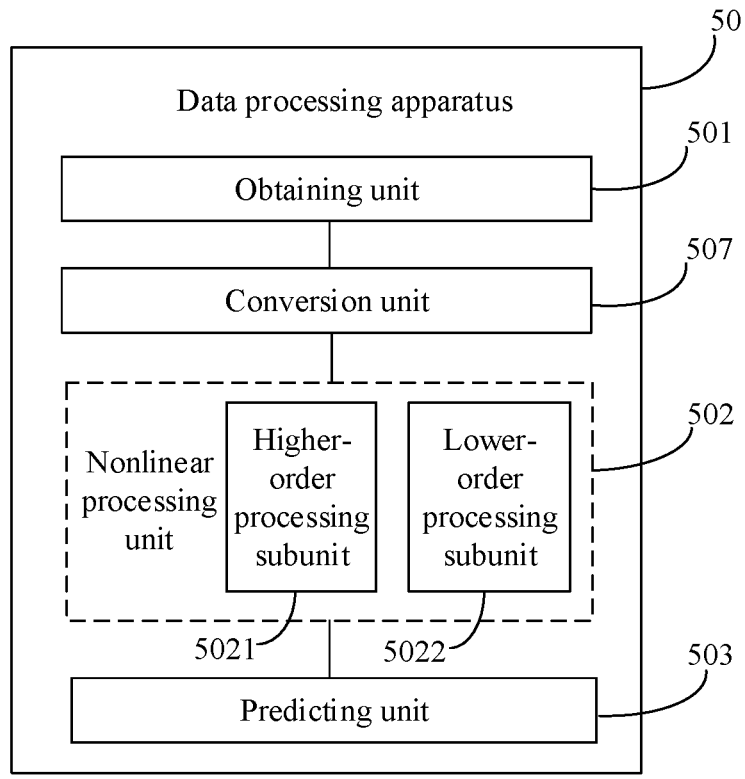
FIG. 8 is a schematic structural diagram of a data processing apparatus according to another embodiment of this application.

The plurality of pieces of feature data are a plurality of pieces of sparse feature data. FIG. 8 is a schematic structural diagram of a data processing apparatus according to another embodiment of this application. As shown in FIG. 8, based on FIG. 5, the data processing apparatus 50 may further include:

a conversion unit 507, configured to convert the plurality of pieces of sparse feature data into a plurality of pieces of dense feature data.

The nonlinear processing unit 502 may be further configured to automatically perform two different types of nonlinear combination processing on the plurality of pieces of dense feature data to obtain two groups of processed data.

In conclusion, based on the data processing apparatus provided in this embodiment of the present invention, the nonlinear processing unit can automatically perform two different types of nonlinear combination processing (higher-order nonlinear combination processing and lower-order nonlinear combination processing) on the feature data to obtain two groups of processed data. However, in the related art, one group of processed data (including at least one piece of higher-order data) can be obtained by performing one type of nonlinear combination processing (higher-order nonlinear combination processing) on feature data. In other words, a data volume of the two groups of processed data obtained in this embodiment of the present invention is greater than a data volume of one group of processed data obtained in the related art, and a large amount of data is needed to implement accurate prediction. Therefore, prediction data obtained based on two groups of processed data in this embodiment of the present invention is more accurate than prediction data obtained based on one group of processed data in the related art.

Further, in this embodiment of the present invention, the target data based on which the prediction data is determined may further include: the group of first auxiliary data obtained by the linear processing unit and the group of second auxiliary data obtained by the empirical processing unit. In other words, the target data in this embodiment of the present invention may include a total of four groups of data: the group of higher-order data, the group of lower-order data, the group of first auxiliary data, and the group of second auxiliary data, thereby further increasing an amount of the target data based on which the prediction data is finally determined and further improving accuracy of the prediction data.

All or some of the foregoing embodiments can be implemented by using software, hardware, firmware, or any combination thereof. When the embodiments are implemented by using the software, all or some of the embodiments can be implemented in a form of a computer program product. The computer program product includes one or more computer instructions. When the computer program instructions are loaded and executed on a computer, all or some of the procedures or functions according to the embodiments of the present invention are generated. The computer can be a general-purpose computer, a computer network, or another programmable apparatus. The computer instructions can be stored in a computer-readable storage medium or transmitted from a computer-readable storage medium to another computer-readable storage medium. For example, the computer instructions can be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium can be any available medium accessible to a computer, or a data storage device, such as a server or a data center integrating one or more available media. The available medium can be a magnetic medium (for example, a floppy disk, a hard disk, or a magnetic tape), an optical medium, a semiconductor medium (for example, a solid-state drive), or the like.

The term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be noted that, mutual reference can be made between the method embodiments provided in the embodiments of the present invention and corresponding apparatus embodiments. This is not limited in the embodiments of the present invention. A sequence of operations of the method embodiments provided in the embodiments of the present invention can be properly adjusted, and operations can be also correspondingly added or deleted based on a case. Any changed method readily figured out by a person skilled in the art within the technical scope disclosed in the embodiments of the present invention shall fall within the protection scope of the embodiments of the present invention. Details are not described herein. The sequence numbers of the embodiments of the present invention are merely for illustrative purposes, and are not intended to indicate priorities of the embodiments.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A data processing method, comprising:
    obtaining a plurality of pieces of feature data for an object in a computing environment, wherein the plurality of pieces of feature data include attribute data of the object and attribute data of a user accessing the object;
    performing two different types of nonlinear combination processing operations on the plurality of pieces of feature data to obtain two groups of processed data, wherein the two groups of processed data comprise a group of higher-order data and a group of lower-order data, wherein each piece of higher-order data in the group of higher-order data is a nonlinear combination of m pieces of feature data in the plurality of pieces of feature data, and wherein each piece of lower-order data in the group of lower-order data is a nonlinear combination of n pieces of feature data in the plurality of pieces of feature data, wherein $m \geq 3$, and $m > n \geq 2$, wherein the group of higher-order data is obtained from the plurality of pieces of feature data using a machine learning model; and
    determining prediction data based on a plurality of pieces of target data, wherein the plurality of pieces of target data comprise the two groups of processed data.

2. The data processing method according to claim 1, wherein the performing of the two different types of nonlinear combination processing operations on the plurality of pieces of feature data to obtain two groups of processed data comprises:
    performing a higher-order nonlinear combination processing operation on the plurality of pieces of feature data to obtain the group of higher-order data; and
    performing a lower-order nonlinear combination processing operation on the plurality of pieces of feature data to obtain the group of lower-order data.

3. The data processing method according to claim 1, wherein after obtaining the plurality of pieces of feature data, the method further comprises:
    performing a linear combination processing operation on the plurality of pieces of feature data to obtain a group of first auxiliary data, wherein the group of first auxiliary data is a linear combination of at least two pieces of feature data in the plurality of pieces of feature data, and wherein the plurality of pieces of target data further comprise at least one piece of the group of first auxiliary data.

4. The data processing method according to claim 3, further comprising:
    performing a lower-order nonlinear combination processing operation on the plurality of pieces of feature data by using a factorization machine (FM) based processing module or a field-aware factorization machine (FFM)-based processing module, to obtain the group of lower-order data,
    wherein the performing of the linear combination processing operation on the plurality of pieces of feature data to obtain the group of first auxiliary data comprises: performing a linear combination processing operation on the plurality of pieces of feature data by using the FM-based processing module or the FFM-based processing module, to obtain the group of first auxiliary data.

5. The data processing method according to claim 1, wherein before determining the prediction data based on the plurality of pieces of target data, the method further comprises:

determining x pieces of empirical feature data with reference to both expert experience and the plurality of pieces of feature data, wherein x≥1, and wherein the x pieces of empirical feature data comprise: one or more of data obtained from the plurality of pieces of feature data with reference to the expert experience or data obtained by performing a nonlinear combination processing operation on at least two pieces of feature data in the plurality of pieces of feature data with reference to the expert experience; and processing the x pieces of empirical feature data to obtain a group of second auxiliary data, wherein the plurality of pieces of target data further comprise the group of second auxiliary data; and wherein when x=1, the group of second auxiliary data is one piece of empirical feature data; or when x>1, the group of second auxiliary data is one or more of a first combination of data or a second combination of data, wherein the first combination of data is a linear combination of at least two pieces of empirical feature data in the x pieces of empirical feature data, and wherein the second combination of data is a nonlinear combination of at least two pieces of empirical feature data in the x pieces of empirical feature data.

6. The data processing method according to claim 1, wherein the plurality of pieces of feature data are a plurality of pieces of sparse feature data; and
after obtaining the plurality of pieces of feature data, the method comprises:
converting the plurality of pieces of sparse feature data into a plurality of pieces of dense feature data; and
wherein the two different types of nonlinear combination processing operations
are performed on the plurality of pieces of dense feature data.

7. A data processing apparatus, comprising:
a processor with a plurality of modules executing thereon, wherein the plurality of modules comprise an obtaining unit, a nonlinear processing unit, and a predicting unit executing thereon;
wherein the obtaining unit is configured to obtain a plurality of pieces of feature data for an object in a computing environment, wherein the plurality of pieces of feature data include attribute data of the object and attribute data of a user accessing the object;
wherein the nonlinear processing unit is configured to perform two different types of nonlinear combination processing operations on the plurality of pieces of feature data to obtain two groups of processed data, wherein the two groups of processed data comprise a group of higher-order data and a group of lower-order data, wherein each piece of higher-order data in the group of higher-order data is a nonlinear combination of m pieces of feature data in the plurality of pieces of feature data, and wherein each piece of lower-order data in the group of lower-order data is a nonlinear combination of n pieces of feature data in the plurality of pieces of feature data, wherein m≥3, and m>n≥2, wherein the group of higher-order data is obtained from the plurality of pieces of feature data using a machine learning model; and
wherein the predicting unit is configured to determine prediction data based on a plurality of pieces of target data, wherein the plurality of pieces of target data comprise the two groups of processed data.

8. The data processing apparatus according to claim 7, wherein the plurality of modules further comprise:

a higher-order processing subunit, configured to perform a higher-order nonlinear combination processing operation on the plurality of pieces of feature data to obtain the group of higher-order data; and a lower-order processing subunit, configured to perform a lower-order nonlinear combination processing operation on the plurality of pieces of feature data to obtain the group of lower-order data.

9. The data processing apparatus according to claim 7, wherein the plurality of modules further comprise:
a linear processing unit, configured to perform a linear combination processing operation on the plurality of pieces of feature data to obtain a group of first auxiliary data, wherein the group of first auxiliary data is a linear combination of at least two pieces of feature data in the plurality of pieces of feature data, and wherein the plurality of pieces of target data further comprise at least one piece of the group of first auxiliary data.

10. The data processing apparatus according to claim 9, wherein the plurality of modules further comprise:
a factorization machine FM-based processing module or a field-aware factorization machine FFM-based processing module;
wherein the FM-based processing module comprises a lower-order processing subunit and the linear processing unit; and
wherein the FFM-based processing module comprises a lower-order processing subunit and the linear processing unit.

11. The data processing apparatus according to claim 7, wherein the plurality of modules further comprise:
a determining unit, configured to determine x pieces of empirical feature data with reference to both expert experience and the plurality of pieces of feature data, wherein x≥1, and wherein the x pieces of empirical feature data comprise: one or more data obtained from the plurality of pieces of feature data with reference to the expert experience or data obtained by performing a nonlinear combination processing on at least two pieces of feature data in the plurality of pieces of feature data with reference to the expert experience; and an empirical processing unit, configured to process the x pieces of empirical feature data to obtain a group of second auxiliary data, wherein the plurality of pieces of target data further comprise the group of second auxiliary data; and wherein when x=1, the group of second auxiliary data is one piece of empirical feature data; or wherein when x>1, the group of second auxiliary data is one or more of a first combination of data or a second combination of data, wherein the first combination of data is a linear combination of at least two pieces of empirical feature data in the x pieces of empirical feature data, and wherein the second combination of data is a nonlinear combination of at least two pieces of empirical feature data in the x pieces of empirical feature data.

12. The data processing apparatus according to claim 7, wherein the plurality of pieces of feature data are a plurality of pieces of sparse feature data, and the data processing apparatus further comprises:
a conversion unit, configured to convert the plurality of pieces of sparse feature data into a plurality of pieces of dense feature data, wherein the nonlinear processing unit is further configured to:
perform the two different types of nonlinear combination processing operations on the plurality of pieces of dense feature data to the obtain the two groups of processed data.

13. A data processing apparatus, comprising:
a memory configured to store instructions; and
a processor coupled to the memory and configured to execute the instructions, which cause the processor to:
obtain a plurality of pieces of feature data for an object in a computing environment, wherein the plurality of pieces of feature data include attribute data of the object and attribute data of a user accessing the object;
perform two different types of nonlinear combination processing operations on the plurality of pieces of feature data to obtain two groups of processed data, wherein the two groups of processed data comprise a group of higher-order data and a group of lower-order data, wherein each piece of higher-order data in the group of higher-order data is a nonlinear combination of m pieces of feature data in the plurality of pieces of feature data, and wherein each piece of lower-order data in the group of lower-order data is to a nonlinear combination of n pieces of feature data in the plurality of pieces of feature data, wherein m≥3, and m>n≥2, wherein the group of higher-order data is obtained from the plurality of pieces of feature data using a machine learning model; and
determine prediction data based on a plurality of pieces of target data, wherein the plurality of pieces of target data comprise the two groups of processed data.

14. The data processing apparatus according to claim 13, wherein the instructions further cause processor to:
perform a higher-order nonlinear combination processing operation on the plurality of pieces of feature data to obtain the group of higher-order data; and
perform a lower-order nonlinear combination processing operation on the plurality of pieces of feature data to obtain the group of lower-order data.

15. The data processing apparatus according to claim 13, wherein the instructions further cause the processor to:
perform a linear combination processing operation on the plurality of pieces of feature data to obtain a group of first auxiliary data, wherein the group of first auxiliary data is a linear combination of at least two pieces of feature data in the plurality of pieces of feature data, and wherein the plurality of pieces of target data further comprise at least one piece of the group of first auxiliary data.

16. The data processing apparatus according to claim 15, wherein the instructions further cause the processor to:
perform a lower-order nonlinear combination processing operation on the plurality of pieces of feature data by using a factorization machine (FM) based processing module or a field-aware factorization machine (FFM)-based processing module, to obtain the group of lower-order data,
wherein the performing of the linear combination processing operation on the plurality of pieces of feature data to obtain a group of first auxiliary data comprises:
performing a linear combination processing operation on the plurality of pieces of feature data by using the FM-based processing module or the FFM-based processing module, to obtain the group of first auxiliary data.

17. The data processing apparatus according to claim 13, wherein the instructions further cause the processor to:
determine x pieces of empirical feature data with reference to both expert experience and the plurality of pieces of feature data, wherein x≥1, and wherein the x pieces of empirical feature data comprise: one or more of data obtained from the plurality of pieces of feature data with reference to the expert experience or data obtained by performing a nonlinear combination processing operation on at least two pieces of feature data in the plurality of pieces of feature data with reference to the expert experience; and
process the x pieces of empirical feature data to obtain a group of second auxiliary data, wherein the plurality of pieces of target data further comprise the group of second auxiliary data; and wherein when x=1, the group of second auxiliary data is piece of empirical feature data; or when x>1, the group of second auxiliary data is one or more of a first data combination or a second combination of data, wherein the first data combination is a linear combination of at least two pieces of empirical feature data in the x pieces of empirical feature data, and wherein the second combination of data is a nonlinear combination of at least two pieces of empirical feature data in the x pieces of empirical feature data.

18. The data processing apparatus according to claim 13, wherein the plurality of pieces of feature data are a plurality of pieces of sparse feature data; and
wherein after obtaining the plurality of pieces of feature data, the instructions further cause the processor to:
convert the plurality of pieces of sparse feature data into a plurality of pieces of dense feature data; and
wherein the two different types of nonlinear combination processing operations
are performed on the plurality of pieces of dense feature data.

19. A non-transitory computer readable storage medium, wherein the non-transitory computer readable storage medium stores a computer program, and when the computer program is executed by a processor, the data processing method according to claim 1 is implemented.

* * * * *